(12) United States Patent
Aoki

(10) Patent No.: US 12,321,090 B2
(45) Date of Patent: Jun. 3, 2025

(54) LIGHT SOURCE APPARATUS AND PROJECTOR

(71) Applicant: SEIKO EPSON CORPORATION, Tokyo (JP)

(72) Inventor: Shigekazu Aoki, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 317 days.

(21) Appl. No.: 18/159,167

(22) Filed: Jan. 25, 2023

(65) Prior Publication Data
US 2023/0236490 A1 Jul. 27, 2023

(30) Foreign Application Priority Data
Jan. 25, 2022 (JP) .................................. 2022-009383

(51) Int. Cl.
G03B 21/20 (2006.01)
(52) U.S. Cl.
CPC .................................. G03B 21/208 (2013.01)
(58) Field of Classification Search
None
See application file for complete search history.

(56) References Cited

U.S. PATENT DOCUMENTS

| | | | |
|---|---|---|---|
| 11,385,533 B2 | 7/2022 | Takagi | |
| 2006/0152689 A1 | 7/2006 | Oh et al. | |
| 2007/0216871 A1 | 9/2007 | Yoshikawa et al. | |
| 2016/0139328 A1* | 5/2016 | Hikmet | F21S 41/16 362/84 |
| 2020/0026172 A1 | 1/2020 | Sakata et al. | |

FOREIGN PATENT DOCUMENTS

| | | |
|---|---|---|
| CN | 202393959 U | 8/2012 |
| JP | 2006-344764 A | 12/2006 |
| JP | 2007-256337 A | 10/2007 |
| JP | 2010-128171 A | 6/2010 |
| JP | 2016-526751 A | 9/2016 |
| JP | 2019-075577 A | 5/2019 |
| JP | 2020-201379 A | 12/2019 |
| JP | 2020-013058 A | 1/2020 |
| WO | WO2020254439 A | 12/2020 |
| WO | WO2020254455 A | 12/2020 |

OTHER PUBLICATIONS

U.S. Appl. No. 10/211,381, filed Feb. 19, 2019, Yamashita.

* cited by examiner

Primary Examiner — Bao-Luan Q Le
Assistant Examiner — Danell L Owens
(74) Attorney, Agent, or Firm — Dority & Manning, P.A.

(57) ABSTRACT

A light source apparatus according to an aspect of the present disclosure includes a light emitter that outputs light, a light guiding member that guides the light outputted from the light emitter, and a support member that supports the light guiding member. The light guiding member has a first surface and a second surface that intersect with the longitudinal direction of the light guiding member and are located on sides opposite from each other, and a third surface that intersects with the first and second surfaces, and causes light to exit via the first surface. The support member has a support surface that faces the third surface of the light guiding member. The support surface has a contact section that is in contact with the third surface and a noncontact section that is not in contact with the third surface. The third surface is a planar surface, and the contact section is a planar surface.

10 Claims, 5 Drawing Sheets

LIGHT SOURCE APPARATUS AND PROJECTOR

The present application is based on, and claims priority from JP Application Serial Number 2022-009383, filed Jan. 25, 2022, the disclosure of which is hereby incorporated by reference herein in its entirety.

BACKGROUND

1. Technical Field

The present disclosure relates to a light source apparatus and a projector.

2. Related Art

As a light source apparatus used in a projector, there has been a proposed light source apparatus using fluorescence emitted from a phosphor when the phosphor is irradiated with excitation light outputted from a light emitter.

WO 2020/254455 discloses a light source apparatus including an excitation light source that outputs excitation light, a rod-shaped phosphor that converts the excitation light into fluorescence, and a mirror that reflects the fluorescence generated in the phosphor. The fluorescence exits via one end surface of the phosphor. The mirror is provided at an end surface opposite from the end surface via which the fluorescence exits.

WO 2020/254455 describes that the phosphor may be in physical contact with one surface of a heat conductive member, or that the average distance between the phosphor and the heat conductive member may be greater than zero. When the phosphor and the heat conductive member are separate from each other and the surface of the phosphor is in contact with an air layer, the fluorescence is guided while totally reflected off the surface of the phosphor, so that the fluorescence is not lost. In contrast, when the phosphor and the heat conductive member are in contact with each other, and the reflectance of the heat conductive member is, for example, 85%, the fluorescence is lost by about 15%. On the other hand, when the phosphor and the heat conductive member are separate from each other, heat of the phosphor is not sufficiently transferred to the heat conductive member, resulting in a rise in the temperature of the phosphor and a decrease in the wavelength conversion efficiency thereof. It is thus difficult to suppress both the loss of the fluorescence due to the reflection thereof at the heat conductive member and the decrease in the wavelength conversion efficiency due to the rise in the temperature of the phosphor. It is therefore difficult to extract fluorescence having desired intensity from the phosphor.

The above description has been made with reference to the light source apparatus including a light guiding member containing a phosphor by way of example, and it is also desirable to provide a light source apparatus that includes a light guiding member containing no phosphor but can produce light having desired intensity by suppressing loss of light due to reflection thereof at a heat conductive member and by suppressing a rise in the temperature of the light guiding member.

SUMMARY

To achieve the object described above, a light source apparatus according to an aspect of the present disclosure includes a light emitter that outputs light, a light guiding member that guides the light outputted from the light emitter, and a support member that supports the light guiding member. The light guiding member has a first surface and a second surface that intersect with a longitudinal direction of the light guiding member and are located on sides opposite from each other, and a third surface that intersects with the first and second surfaces, and causes light to exit via the first surface. The support member has a support surface that faces the third surface of the light guiding member. The support surface has a contact section that is in contact with the third surface and a noncontact section that is not in contact with the third surface. The third surface is a planar surface, and the contact section is a planar surface.

A projector according to another aspect of the present disclosure includes the light source apparatus according to the aspect of the present disclosure, a light modulator that modulates light outputted from the light source apparatus and containing the second light in accordance with image information, and a projection optical apparatus that projects the light modulated by the light modulator.

DESCRIPTION OF EXEMPLARY EMBODIMENTS

First Embodiment

A first embodiment of the present disclosure will be described below with reference to the drawings.

A projector according to the present embodiment is an example of a projector using liquid crystal panels as a light modulator.

In the following drawings, components are drawn at different dimensional scales in some cases for clarification of each of the components.

Figure 1:
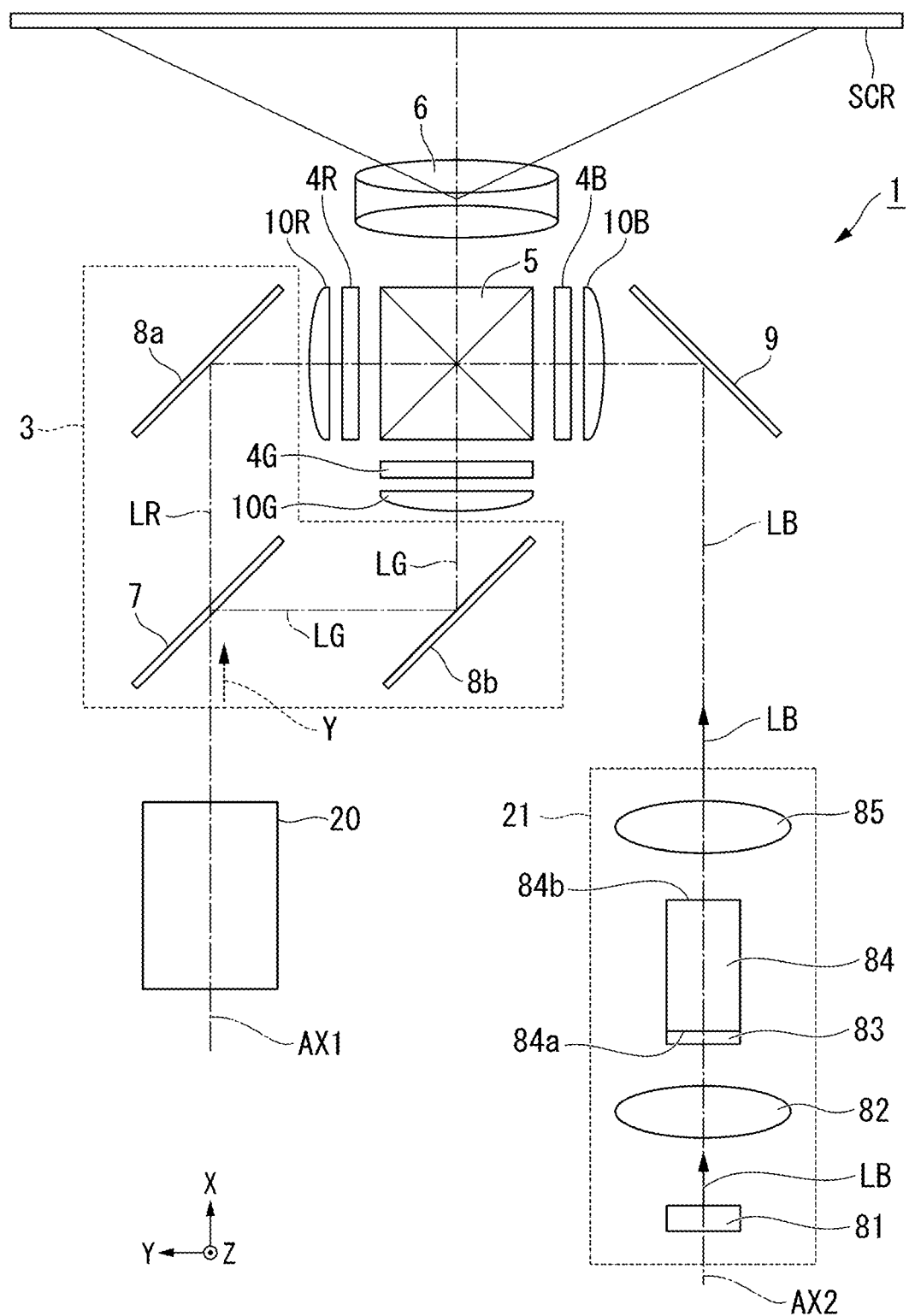
FIG. 1 shows a schematic configuration of a projector according to a first embodiment.

FIG. 1 shows a schematic configuration of a projector 1 according to the present embodiment.

The projector 1 according to the present embodiment is a projection-type image display apparatus that displays a color image on a screen (projection receiving surface) SCR, as shown in FIG. 1. The projector 1 includes three light modulators corresponding to three types of color light, that is, red light LR, green light LG, and blue light LB.

The projector 1 includes a first illuminator 20, a second illuminator 21, a color separation system 3, light modulators 4R, 4G, and 4B, a light combiner 5, and a projection optical apparatus 6.

The first illuminator 20 outputs yellow fluorescence Y toward the color separation system 3. The second illuminator 21 outputs blue light LB toward the light modulator 4B.

Detailed configurations of the first illuminator 20 and the second illuminator 21 will be described later.

The following description with reference to the drawings will be made by using an XYZ orthogonal coordinate system as required. The axis Z is an axis extending along the upward-downward direction of the projector 1. The axis X is an axis parallel to an optical axis AX1 of the first illuminator 20 and an optical axis AX2 of the second illuminator 21. The axis Y is an axis perpendicular to the axes X and Z. The optical axis AX1 of the first illuminator 20 is the center axis of the fluorescence Y outputted from the first illuminator 20. The optical axis AX2 of the second illuminator 21 is the center axis of the blue light LB outputted from the second illuminator 21.

The color separation system 3 separates the yellow fluorescence Y outputted from the first illuminator 20 into the red light LR and the green light LG. The color separation system 3 includes a dichroic mirror 7, a first reflection mirror 8a, and a second reflection mirror 8b.

The dichroic mirror 7 separates the fluorescence Y into the red light LR and the green light LG. The dichroic mirror 7 transmits the red light LR and reflects the green light LG. The second reflection mirror 8b is disposed in the optical path of the green light LG. The second reflection mirror 8b reflects the green light LG reflected off the dichroic mirror 7 toward the light modulator 4G. The first reflection mirror 8a is disposed in the optical path of the red light LR. The first reflection mirror 8a reflects the red light LR having passed through the dichroic mirror 7 toward the light modulator 4R.

On the other hand, the blue light LB outputted from the second illuminator 21 is reflected off a reflection mirror 9 toward the light modulator 4B.

The configuration of the second illuminator 21 will be described below.

The second illuminator 21 includes a light source section 81, a focusing lens 82, a diffuser plate 83, a rod lens 84, and a relay lens 85. The light source section 81 is formed of at least one semiconductor laser. The light source section 81 outputs the blue light LB formed of laser light. The light source section 81 is not necessarily formed of a semiconductor laser and may be formed of an LED that outputs blue light.

The focusing lens 82 is formed of a convex lens. The focusing lens 82 causes the blue light LB outputted from the light source section 81 to be incident on the diffuser plate 83 with the blue light LB substantially focused thereon. The diffuser plate 83 diffuses the blue light LB having exited out of the focusing lens 82 into blue light LB diffused by a predetermined degree to generate blue light LB having a substantially uniform light orientation distribution similar to that of the fluorescence Y outputted from the first illuminator 20. The diffuser plate 83 is, for example, a ground glass plate made of optical glass.

The blue light LB diffused by the diffuser plate 83 enters the rod lens 84. The rod lens 84 has a prismatic columnar shape extending along the optical axis AX2 of the second illuminator 21. The rod lens 84 has one end that is a light incident end surface 84a and the other end that is a light exiting end surface 84b. The diffuser plate 83 is fixed to the light incident end surface 84a of the rod lens 84 via an optical adhesive (not shown). It is desirable that the refractive index of the diffuser plate 83 matches as much as possible with the refractive index of the rod lens 84.

The blue light LB propagates through the interior of the rod lens 84 while being totally reflected therein and exits via the light exiting end surface 84b with the illuminance distribution uniformity of the blue light LB increased. The blue light LB having exited out of the rod lens 84 enters the relay lens 85. The relay lens 85 causes the blue light LB having the illuminance distribution uniformity increased by the rod lens 84 to be incident on the reflection mirror 9.

The light exiting end surface 84b of the rod lens 84 has a rectangular shape substantially similar to the shape of an image formation region of the light modulator 4B. The blue light LB having exited out of the rod lens 84 is thus efficiently incident on the image formation region of the light modulator 4B.

The light modulator 4R modulates the red light LR in accordance with image information to form image light corresponding to the red light LR. The light modulator 4G modulates the green light LG in accordance with image information to form image light corresponding to the green light LG. The light modulator 4B modulates the blue light LB in accordance with image information to form image light corresponding to the blue light LB.

The light modulators 4R, 4G, and 4B are each, for example, a transmissive liquid crystal panel. Polarizers (not shown) are disposed on the light incident and exiting sides of each of the liquid crystal panels. The polarizers each transmit only linearly polarized light polarized in a specific direction.

A field lens 10R is disposed at the light incident side of the light modulator 4R. A field lens 10G is disposed at the light incident side of the light modulator 4G. A field lens 10B is disposed at the light incident side of the light modulator 4B. The field lens 10R parallelizes the chief ray of the red light LR to be incident on the light modulator 4R. The field lens 10G parallelizes the chief ray of the green light LG to be incident on the light modulator 4G. The field lens 10B parallelizes the chief ray of the blue light LB to be incident on the light modulator 4B.

The light combiner 5 receives the image light outputted from the light modulator 4R, the image light outputted from the light modulator 4G, and the image light outputted from the light modulator 4B, combines the image light corresponding to the red light LR, the image light corresponding to the green light LG, and the image light corresponding to the blue light LB with one another, and outputs the combined image light toward the projection optical apparatus 6. The light combiner 5 is, for example, a cross dichroic prism.

The projection optical apparatus 6 is formed of a plurality of projection lenses. The projection optical apparatus 6 enlarges the combined image light from the light combiner 5 and projects the enlarged image light toward the screen SCR. An image is thus displayed on the screen SCR.

The configuration of the first illuminator 20 will be described below.

Figure 2:
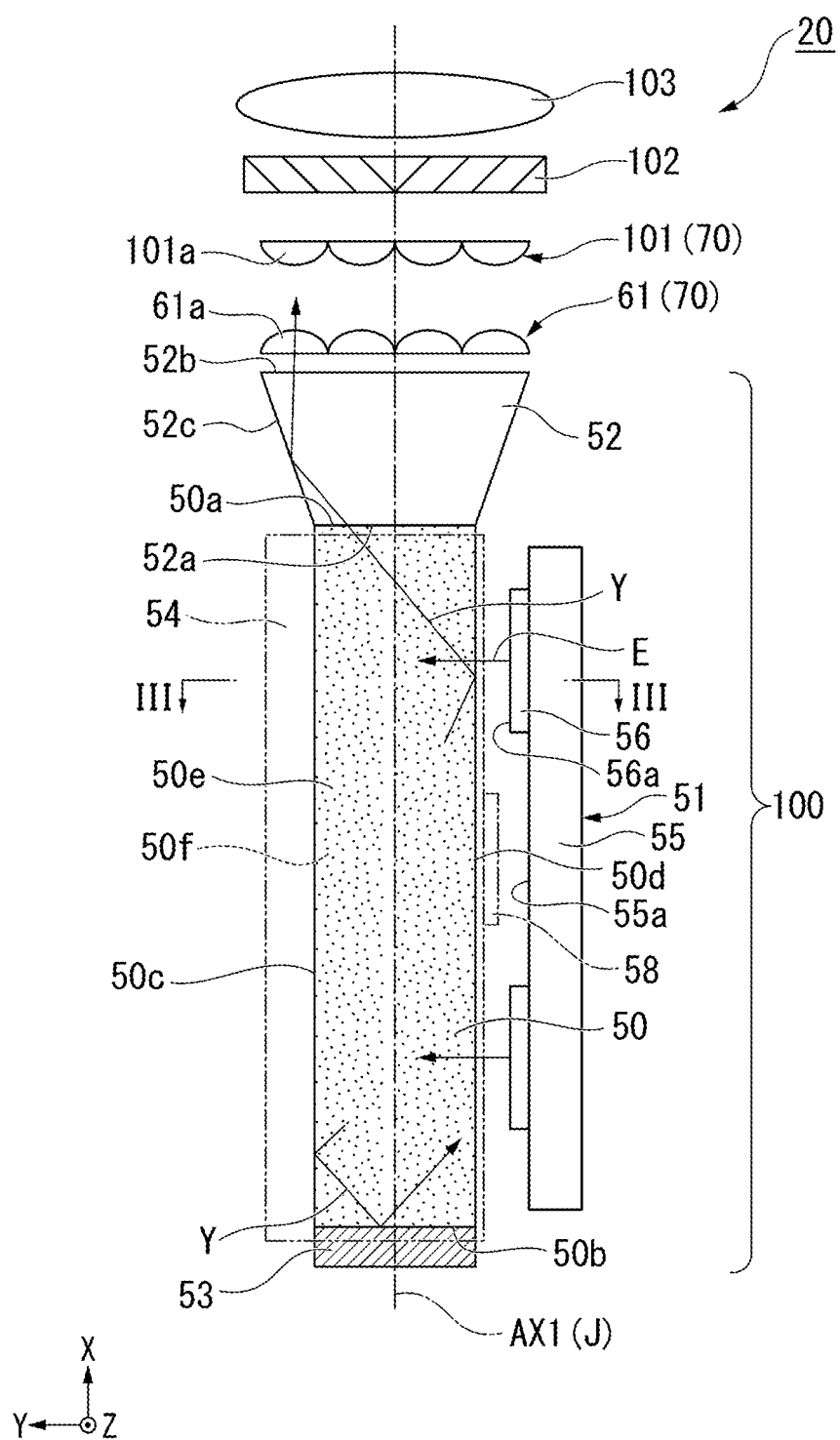
FIG. 2 is a schematic configuration diagram of a first illuminator in the first embodiment.

FIG. 2 is a schematic configuration diagram of the first illuminator 20.

The first illuminator 20 includes a light source apparatus 100, an optical integration system 70, a polarization converter 102, and a superimposing system 103, as shown in FIG. 2.

The light source apparatus 100 includes a wavelength conversion member (light guiding member) 50, a light source section 51, an angle conversion member 52, a mirror 53, a support member 54, and a pressing member 58. The light source section 51 includes a substrate 55 and light emitters 56.

The wavelength conversion member 50 has a quadrangular columnar shape extending in the axis-X direction and has six surfaces. The sides of the wavelength conversion member 50 that extend in the axis-X direction are longer than the sides of the wavelength conversion member 50 that extend in the axis-Y direction and the sides thereof that extend in the axis-Z direction. The axis-X direction therefore corresponds to the longitudinal direction of the wavelength conversion member 50. The length of the sides extending in the axis-Y direction is equal to the length of the sides extending in the axis-Z direction. That is, the wavelength conversion member 50 has a square cross-sectional shape taken along a plane perpendicular to the axis-X direction. The wavelength conversion member 50 may instead have an oblong cross-sectional shape taken along a plane perpendicular to the axis-X direction.

The wavelength conversion member 50 has a first surface 50a and a second surface 50b, which intersect with the longitudinal direction (axis-X direction) of the wavelength conversion member 50 and are located at sides of the wavelength conversion member 50 that are opposite from each other, a third surface 50c and a fourth surface 50d, which intersect with the first surface 50a and the second surface 50b and are located at sides of the wavelength conversion member 50 that are opposite from each other, and a fifth surface 50e and a sixth surface 50f, which intersect with the third surface 50c and the fourth surface 50d and are located at sides of the wavelength conversion member 50 that are opposite from each other. In the following description, the third surface 50c, the fourth surface 50d, the fifth surface 50e, and the sixth surface 50f may each be referred to as a "side surface".

The wavelength conversion member 50 at least contains a phosphor and converts excitation light (first light) E having a first wavelength band into the fluorescence (second light) Y having a second wavelength band different from the first wavelength band. The excitation light E enters the wavelength conversion member 50 via the fourth surface 50d. The fluorescence Y is guided through the interior of the wavelength conversion member 50, and then exits via the first surface 50a.

The wavelength conversion member 50 contains a ceramic phosphor formed of a polycrystal phosphor that converts the excitation light E in terms of wavelength into the fluorescence Y. The second wavelength band of the fluorescence Y is, for example, a yellow wavelength band ranging from 490 to 750 nm. That is, the fluorescence Y is yellow fluorescence containing a red light component and a green light component.

The wavelength conversion member 50 may contain a single crystal phosphor in place of a polycrystal phosphor. The wavelength conversion member 50 may instead be made of fluorescent glass. Still instead, the wavelength conversion member 50 may be formed of a binder which is made of glass or resin and in which a large number of phosphor particles are dispersed. The wavelength conversion member 50 made of any of the materials described above converts the excitation light E into the fluorescence Y having the second wavelength band.

Specifically, the material of the wavelength conversion member 50 contains, for example, an yttrium-aluminum-garnet-based (YAG-based) phosphor. Consider YAG:Ce, which contains cerium (Ce) as an activator, by way of example, the wavelength conversion member 50 is made, for example, of a material produced by mixing raw powder materials containing $Y_2O_3$, $Al_2O_3$, $CeO_3$, and other constituent elements with one another and causing the mixture to undergo a solid-phase reaction, Y—Al—O amorphous particles produced by using a coprecipitation method, a sol-gel method, or any other wet method, or YAG particles produced by using a spray-drying method, a flame-based thermal decomposition method, a thermal plasma method, or any other gas-phase method.

The light source section 51 includes the light emitters 56 each having a light emitting surface 56a, via which the excitation light E having the first wavelength band exits. The light emitters 56 are each formed, for example, of a light emitting diode (LED). The light emitting surface 56a of each of the light emitters 56 faces the fourth surface 50d of the wavelength conversion member 50, and the light emitter 56 emits the excitation light E via the light emitting surface 56a toward the fourth surface 50d. The first wavelength band is, for example, a blue-violet wavelength band ranging from 400 to 480 nm and has a peak wavelength of, for example, 445 nm. The light source section 51 is thus provided so as to face one of the four side surfaces, which extend along the longitudinal direction of the wavelength conversion member 50.

The substrate 55 supports the light emitters 56. A plurality of light emitters 56 are provided at one surface 55a of the substrate 55. In the present embodiment, the light source section 51 is formed of the light emitters 56 and the substrate 55 and may further include a light guiding plate, a diffuser plate, a lens, and other optical members. The number of light emitters 56 is not limited to a specific number.

The support member 54 is provided so as to surround the circumference of the wavelength conversion member 50. The support member 54 supports the wavelength conversion member 50, and diffuses heat generated by the wavelength conversion member 50 to dissipate the heat out of the support member 54. It is therefore desirable that the support member 54 is made of a material having a predetermined strength and high thermal conductivity. It is desirable to use a metal, such as aluminum and stainless steel, in particular, an aluminum alloy such as a 6061 aluminum alloy as the material of the support member 54. A specific shape of the support member 54 will be described later.

The pressing member 58 presses the wavelength conversion member 50 from the side facing the fourth surface 50d toward the support member 54. The wavelength conversion member 50 is thus fixed to and pressed against the support member 54 without, for example, an adhesive between the two members. The pressing member 58 is, for example, an elastic member such as a leaf spring.

The mirror 53 is provided at the second surface 50b of the wavelength conversion member 50. The mirror 53 reflects the fluorescence Y having been guided through the interior of the wavelength conversion member 50 and having reached the second surface 50b. The mirror 53 is formed of a metal film or a dielectric multilayer film formed on the second surface 50b of the wavelength conversion member 50.

In the first illuminator 20, when the excitation light E outputted from the light source section 51 enters the wavelength conversion member 50, the phosphor contained in the wavelength conversion member 50 is excited, and the fluorescence Y emits from arbitrary light emission points. The fluorescence Y travels omnidirectionally from the arbitrary light emission points, and the fluorescence Y traveling toward the four side surfaces 50c, 50d, 50e, and 50f travels toward the first surface 50a or the second surface 50b while repeatedly totally reflected off the side surfaces 50c, 50d, 50e, and 50f at a plurality of locations. The fluorescence Y traveling toward the first surface 50a passes through the first surface 50a and enters the angle conversion member 52. The fluorescence Y traveling toward the second surface 50b is reflected off the mirror 53 and travels toward the first surface 50a.

Out of the excitation light E having entered the wavelength conversion member 50, a portion of the excitation light E, the portion not having been used to excite the phosphor, is reflected off members around the wavelength conversion member 50, including the light emitters 56 of the light source section 51, or the mirror 53 provided at the second surface 50b. The portion of the excitation light E is therefore confined in the wavelength conversion member 50 and reused.

The angle conversion member 52 is provided at the light exiting side of the first surface 50a of the wavelength conversion member 50. The angle conversion member 52 is formed, for example, of a translucent member, such as a tapered rod. The angle conversion member 52 has a light incident surface 52a, on which the fluorescence Y emitted from the wavelength conversion member 50 is incident, a light exiting surface 52b, via which the fluorescence Y exits, and a side surface 52c, which reflects the fluorescence Y toward the light exiting surface 52b.

The angle conversion member 52 has a truncated quadrangular pyramidal shape, and has a cross-sectional area that is perpendicular to an optical axis J and widens along the light traveling direction. The area of the light exiting surface 52b is therefore greater than the area of the light incident surface 52a. An axis passing through the center of the light exiting surface 52b and the light incident surface 52a and parallel to the axis X is called an optical axis J of the angle conversion member 52. The optical axis J of the angle conversion member 52 coincides with the optical axis AX1 of the first illuminator 20.

The fluorescence Y having entered the angle conversion member 52 changes its orientation while traveling through the interior of the angle conversion member 52 in such a way that the direction of the fluorescence Y approaches the direction parallel to the optical axis J whenever the fluorescence Y is totally reflected off the side surface 52c. The angle conversion member 52 thus converts the exiting angle distribution of the fluorescence Y that exits via the first surface 50a of the wavelength conversion member 50. Specifically, the angle conversion member 52 makes the largest exiting angle of the fluorescence Y at the light exiting surface 52b smaller than the largest incident angle of the fluorescence Y at the light incident surface 52a.

In general, since the etendue of light specified by the product of the area a light exiting region and the solid angle of the light (largest exiting angle) is preserved, the etendue of the fluorescence Y before the fluorescence Y passes through the angle conversion member 52 is preserved after the passage. The angle conversion member 52 in the present embodiment has the configuration in which the area of the light exiting surface 52b is greater than the area of the light incident surface 52a, as described above. The angle conversion member 52 can therefore make the largest exiting angle of the fluorescence Y at the light exiting surface 52b smaller than the largest incident angle of the fluorescence Y incident on the light incident surface 52a from the viewpoint of the etendue preservation.

The angle conversion member 52 is fixed to the wavelength conversion member 50 via an optical adhesive (not shown) so that the light incident surface 52a faces the first surface 50a of the wavelength conversion member 50. That is, the angle conversion member 52 and the wavelength conversion member 50 are in contact with each other via the optical adhesive, and there is no air gap (air layer) between the angle conversion member 52 and the wavelength conversion member 50. If there is an air gap between the angle conversion member 52 and the wavelength conversion member 50, out of the fluorescence Y having reached the light incident surface 52a of the angle conversion member 52, the fluorescence Y incident on the light incident surface 52a at angles of incidence equal to or greater than the critical angle is totally reflected off the light incident surface 52a and cannot enter the angle conversion member 52. In contrast, when there is no air gap between the angle conversion member 52 and the wavelength conversion member 50, as in the present embodiment, the amount of fluorescence Y that cannot enter the angle conversion member 52 can be reduced. It is desirable from the viewpoint described above that the refractive index of the angle conversion member 52 matches as much as possible with the refractive index of the wavelength conversion member 50.

The angle conversion member 52 may be a compound parabolic concentrator (CPC) in place of a tapered rod. The same effect is provided both when a CPC is used as the angle conversion member 52 and when a tapered rod is used as the angle conversion member 52. The light source apparatus 100 may not necessarily include the angle conversion member 52.

The optical integration system 70 includes a first lens array 61 and a second lens array 101. The optical integration system 70, along with the superimposing system 103, forms an illumination homogenizing system that homogenizes the intensity distribution of the fluorescence Y outputted from the light source apparatus 100 at each of the light modulators 4R and 4G, which are illumination receiving regions. The fluorescence Y having exited via the light exiting surface 52b of the angle conversion member 52 enters the first lens array 61. The first lens array 61, along with the second lens array 101 provided in a position downstream from the light source apparatus 100, forms the optical integration system 70.

The first lens array 61 includes a plurality of first lenslets 61a. The plurality of first lenslets 61a are arranged in a matrix in a plane parallel to the plane YZ perpendicular to the optical axis AX1 of the first illuminator 20. The plurality of first lenslets 61a divide the fluorescence Y having exited out of the angle conversion member 52 into a plurality of sub-luminous fluxes. The first lenslets 61a each have a rectangular shape substantially similar to the shape of the image formation region of each of the optical modulators 4R and 4G. The sub-luminous fluxes having exited out of the first lens array 61 are thus each efficiently incident on the image formation region of each of the light modulators 4R and 4G.

The fluorescence Y having exited out of the first lens array 61 travels toward the second lens array 101. The second lens array 101 is disposed so as to face the first lens array 61. The second lens array 101 includes a plurality of second lenslets 101a corresponding to the plurality of first lenslets 61a of the first lens array 61. The second lens array 101, along with the superimposing system 103, brings images of the plurality of first lenslets 61a of the first lens array 61 into focus in the vicinity of the image formation region of each of the light modulators 4R and 4G. The plurality of second lenslets 101a are arranged in a matrix in a plane parallel to the plane YZ perpendicular to the optical axis AX1 of the first illuminator 20.

In the present embodiment, the first lenslets 61a of the first lens array 61 and the second lenslets 101a of the second lens array 101 have the same size, and may instead have sizes different from each other. In the present embodiment, the first lenslets 61a of the first lens array 61 and the second lenslets 101a of the second lens array 101 are so disposed that the optical axes thereof coincide with each other, and may instead be so disposed that the optical axes thereof deviate from each other.

The polarization converter 102 converts the polarization direction of the fluorescence Y having exited out of the second lens array 101. Specifically, the polarization converter 102 converts sub-luminous fluxes of the fluorescence Y into which the first lens array 61 divides the fluorescence Y and which exit out of the second lens array 101 into linearly polarized luminous fluxes.

The polarization converter 102 includes polarization separation layers (not shown) that directly transmit one linearly polarized light component out of polarized light components contained in the fluorescence Y outputted from the light source apparatus 100 and reflect another linearly polarized light components in a direction perpendicular to the optical axis AX1, reflection layers (not shown) that reflect the other linearly polarized light component reflected off the polarization separation layers in the direction parallel to the optical axis AX1, and retardation films (not shown) that convert the other linearly polarized light component reflected off the reflection layers into the one linearly polarized light component.

The cross-sectional structure of the light source apparatus 100 will be described below.

Figure 3:
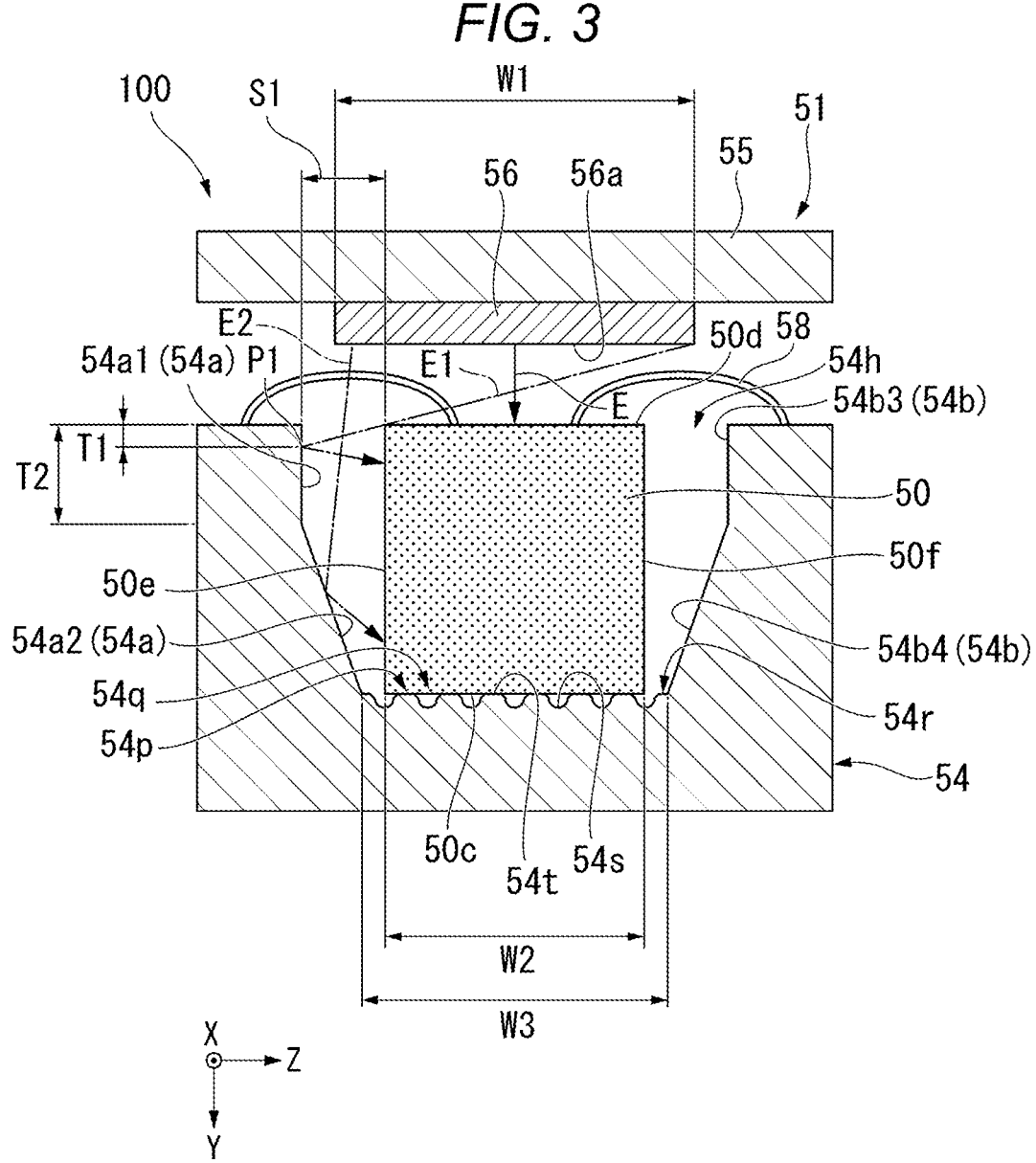
FIG. 3 is a cross-sectional view of a light source apparatus taken along the line III-III in FIG. 2.
Figure 4A:
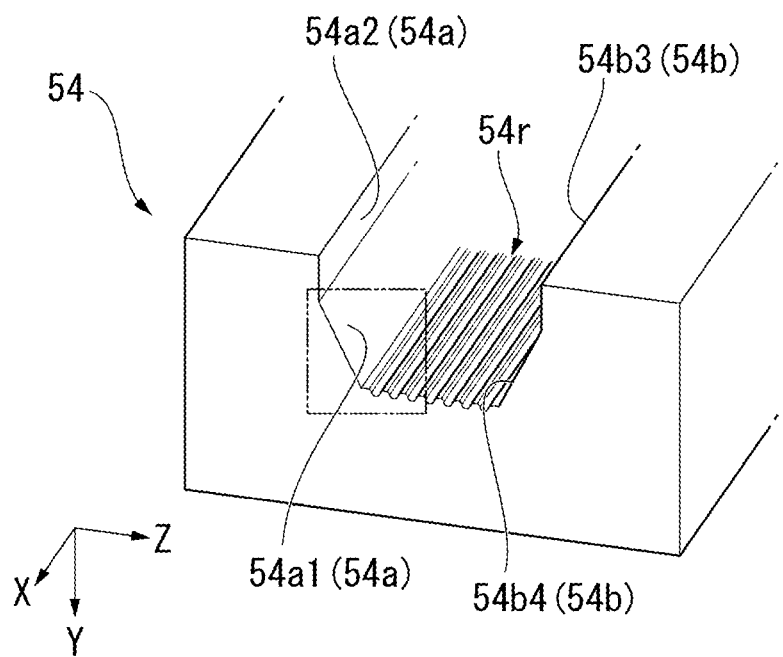
FIG. 4A is a perspective view of a support member.

FIG. 3 is a cross-sectional view of the light source apparatus 100 taken along the line III-III in FIG. 2. FIG. 4A is a perspective view of the support member 54, and FIG. 4B is an enlarged view of key parts of the support member 54 shown in FIG. 4A.

The support member 54 has a housing recess 54h, which houses the wavelength conversion member 50, and has a U-letter-like cross-sectional shape, as shown in FIG. 3. The support member 54 has a support surface 54r, a first wall surface 54a, and a second wall surface 54b. The support surface 54r is formed of the bottom surface of the housing recess 54h. The support surface 54r faces the third surface 50c of the wavelength conversion member 50 and supports the wavelength conversion member 50.

Figure 4B:
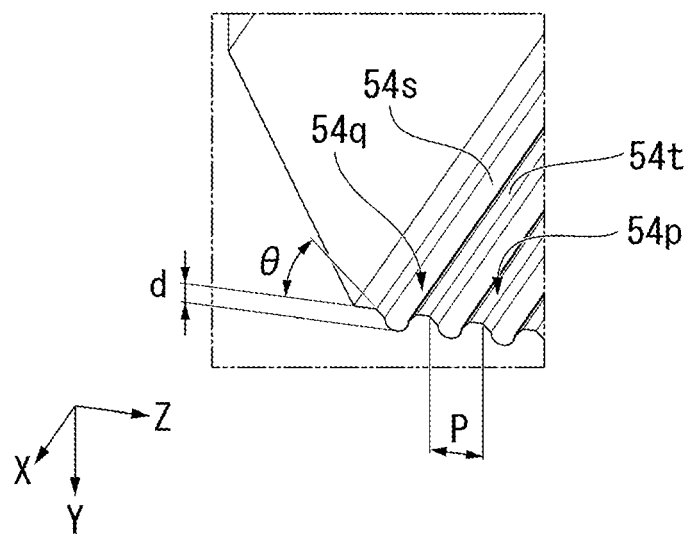
FIG. 4B is an enlarged view of key parts of the support member shown in FIG. 4A.

The support surface 54r is provided with a plurality of protrusions 54p and a plurality of recesses 54q extending in the longitudinal direction (axis-X direction) of the wavelength conversion member, as shown in FIGS. 4A and 4B. That is, the support surface 54r has an uneven shape. The support surface 54r includes contact sections 54t, which are in contact with the third surface of the wavelength conversion member, and noncontact sections 54s, which are not in contact with the third surface of the wavelength conversion member, as shown in FIG. 3.

The contact sections 54t are each formed of a planar surface. The third surface 50c of the wavelength conversion member 50 is formed of a planar surface. The third surface 50c of the wavelength conversion member 50 and the contact sections 54t are therefore in contact with each other not in the form of a surface versus a point or a line, but in the form of a surface versus a surface. In the present specification, "the contact sections are in contact with the third surface of the wavelength conversion member" means that the contact sections are in direct contact with the third surface of the wavelength conversion member and does not mean that the contact sections are in contact with the third surface of the wavelength conversion member via another member. The term "another member" does not include a coating film provided at each of the contact sections or the third surface of the wavelength conversion member. That is, the surface of each of the contact sections may be coated with a reflection film formed of a thin metal film or a dielectric multilayer film, or the third surface of the wavelength conversion member may be coated, for example, with a reflection film that reflects fluorescence or a dielectric multilayer film that transmits excitation light and reflects fluorescence.

The support surface 54r has a plurality of protrusions 54p, which protrude toward the third surface 50c of the wavelength conversion member 50, as described above. The protrusions 54p extend along the longitudinal direction (axis-X direction) of the wavelength conversion member 50. The protrusions 54p may, for example, be continuous from one end to the other end of the support surface 54r, or may be discontinuous at halfway locations. The plurality of protrusions 54p are periodically arranged along a direction (axis-Z direction) that intersects with the longitudinal direction of the wavelength conversion member 50. The contact sections 54t correspond to the top surfaces of the protrusions 54p. The noncontact sections 54s correspond to the groove-shaped recesses 54q between adjacent protrusions 54p. The contact sections 54t and the noncontact sections 54s are alternately arranged. The number of contact sections 54t and noncontact sections 54s is not limited to a specific number, and the arrangement of the contact sections 54t and the noncontact sections 54s is not limited to a specific arrangement. Air is present in the recesses 54q, that is, in the spaces between the third surface 50c of the wavelength conversion member 50 and the noncontact sections 54s.

In the present embodiment, as an example, the bottom surface of the housing recess 54h of the support member 54 is cut with a drill in the axis-X direction to form a plurality of grooves at intervals in the axis-Z direction. The plurality of protrusions 54p and the plurality of recesses 54q are thus formed at the support surface 54r, so that the plurality of contact sections 54t and the plurality of noncontact sections 54s are formed. According to the manufacturing method described above, the plurality of contact sections 54t are flush with one another along substantially the same planar plane. The planarity of the planar surfaces that form the contact sections 54t is smaller than or equal to 5 µm. The planarity is preferably smaller than or equal to 10 µm, more preferably smaller than or equal to 5 µm.

In place of the cutting using a drill, laser machining, wet etching, or any other method can be used to form the uneven shape of the support surface 54r. After the uneven shape is formed by any of the methods described above, the contact sections 54t may be planarized or mirror-finished, for example, in a polishing process.

In the present embodiment, a depth d of the recesses 54q is, for example, 0.06 mm. The intervals p between the contact sections 54t and the noncontact sections 54s is, for example, 0.2 mm. An inclination angle θ of the side surfaces of the recesses 54q with respect to the planar surfaces of the contact sections 54t is, for example, 60°. That is, the protrusions 54p each have a trapezoidal cross-sectional shape. The bottom surface of each of the recesses 54q has a rounded shape having a radius of, for example, 0.03 mm. That is, the recesses 54q each have the cross-sectional shape of a groove having a curved bottom surface. The shapes and dimensions of the protrusions 54p and the recesses 54q are not limited to those described above. For example, the protrusions and recesses may have a symmetrical wavy shape with respect to a reference plane.

The length, in the axis-Y direction, of the wavelength conversion member 50 is, for example, 1.05 mm. The length, in the axis-Z direction, of the wavelength conversion member 50 is, for example, 1.05 mm. The length, in the axis-X direction, of the wavelength conversion member 50 is, for example, 63 mm. The third surface 50c of the wavelength conversion member 50 has the planarity smaller than or equal to 5 µm, as the contact sections 54t of the support member 54 do.

The wavelength conversion member 50 is fixed to and pressed against the support member 54 by the pressing member 58, such as a leaf spring, which is in contact with the fourth surface 50d, as shown in FIG. 3. One end of the pressing member 58 is linked to the support member 54, and the other end of the pressing member 58 is in contact with the fourth surface 50d of the wavelength conversion member 50. The elastic force produced by the pressing member 58 keeps pressing the wavelength conversion member 50 against the support surface 54r of the support member 54. The configuration described above ensures that the wavelength conversion member 50 is in intimate contact with the contact sections 54t of the support surface 54r, whereby the heat generated by the wavelength conversion member 50 is adequately transferred to the support member 54.

The first wall surface 54a corresponds to one side surface of the housing recess 54h, faces the fifth surface 50e of the wavelength conversion member 50, and is separate from the fifth surface 50e. The second wall surface 54b corresponds to the other side surface of the housing recess 54h, faces the sixth surface 50f of the wavelength conversion member 50, and is separate from the sixth surface 50f. That is, a gap S1 is provided between the first wall surface 54a and the fifth surface 50e of the wavelength conversion member 50. The gap S1 is provided between the second wall surface 54b and the sixth surface 50f of the wavelength conversion member 50.

The first wall surface 54a has a first section 54a1, which is located at the side relatively far from the support surface 54r, and a second section 54a2, which is located at the side relatively close to the support surface 54r. The first section 54a1 extends in the direction perpendicular to the support surface 54r, that is, in parallel to the plane XY. The second section 54a2 extends in a direction inclining with respect to the support surface 54r. The second section 54a2 inclines in such a way that it approaches the fifth surface 50e of the wavelength conversion member 50 as it approaches from the side farther from the support surface 54r to the side closer thereto. In other words, the distance between the fifth surface 50e and the second section 54a2 located at the side relatively close to the support surface 54r is smaller than the distance between the fifth surface 50e and the second section 54a2 located at the side relatively close to the first section 54a1. The distance between the fifth surface 50e and the second section 54a2 located at the side relatively close to the support surface 54r represents the shortest length between the fifth surface 50e and the second section 54a2 located at the side relatively close to the support surface 54r. The distance between the fifth surface 50e and the second section 54a2 located at the side relatively close to the first section 54a1 represents the shortest length between the fifth surface 50e and the second section 54a2 located at the side relatively close to the first section 54a1. In the present embodiment, the second section 54a2 is formed of a planar surface.

The second wall surface 54b has the same configuration as that of the first wall surface 54a. That is, the second wall surface 54b has a third section 54b3, which is located at the side relatively far from the support surface 54r, and a fourth section 54b4, which is located at the side relatively close to the support surface 54r. The third section 54b3 extends in the direction perpendicular to the support surface 54r, that is, in parallel to the plane XY. The fourth section 54b4 extends in a direction inclining with respect to the support surface 54r. The fourth section 54b4 inclines in such a way that it approaches the sixth surface 50f of the wavelength conversion member 50 as it approaches from the side farther from the support surface 54r to the side closer thereto. In other words, the distance between the sixth surface 50f and the fourth section 54b4 located at the side relatively close to the support surface 54r is smaller than the distance between the sixth surface 50f and the fourth section 54b4 located at the side relatively close to the third section 54b3. In the present embodiment, the fourth section 54b4 is formed of a planar surface.

In the present embodiment, the first wall surface 54a and the second wall surface 54b are each formed of a surface of metal such as aluminum, stainless steel, or the like which is the constituent material of the support member 54. More specifically, the first wall surface 54a and the second wall surface 54b are each formed of a processed surface that is the metal surface described above on which mirror-finishing has been performed. The first wall surface 54a and the second wall surface 54b therefore each have light reflectance and satisfactorily reflect the excitation light E incident thereon. The first wall surface 54a and the second wall surface 54b may each be formed of a metal film, which is formed on the surface of the metal such as aluminum, stainless steel or the like and made of metal different from the metal, or a dielectric multilayer film formed on the surface of the metal described above. At least the second section 54a2 and the fourth section 54b4 of the first wall surface 54a and the second wall surface 54b need to reflect at least part of the excitation light E.

A dimension W1, along the axis-Z direction, of the light emitting surface 56a of each of the light emitters 56 is greater than a dimension W2, along the axis-Z direction, of the wavelength conversion member 50. The opposite end portions of the light emitting surface 56a of each of the light emitter 56 therefore protrude beyond the third surface 50c of the wavelength conversion member 50 in the axis-Z direction. Specifically, the opposite end portions of the light emitting surface 56a of each of the light emitters 56 protrude to positions where the opposite end portions overlap with the gap S1 between the fifth surface 50e and the first wall surface 54a and the gap S1 between the sixth surface 50f and the second wall surface 54b, respectively. In other words, when the light emitting surface 56a is viewed from the side facing the support surface 54r along the axis-Y direction, a portion of the light emitting surface 56a overlaps with the third surface 50c, and the other portion of the light emitting surface 56a overlaps with the gap S1 between the fifth surface 50e and the first wall surface 54a and the gap S1 between the sixth surface 50f and the second wall surface 54b.

Let P1 be the position where excitation light E1 emitted from the +Z-side end of the light emitting surface 56a, passing through the −Z-side corner of the fourth surface 50d of the wavelength conversion member 50, and traveling toward the first wall surface 54a is incident on the first wall surface 54a, and T1 be the distance from the −Y-side end of the first wall surface 54a to the position P1. Under the definition described above, a dimension T2, along the axis-Y direction, of the first section 54a1 is desirably greater than at least the distance T1.

In the present embodiment, a dimension W3, along the axis-Z direction, of the support surface 54r of the support member 54 is greater than the dimension W2, along the axis-Z direction, of the wavelength conversion member 50.

The opposite end portions of the support surface 54r therefore protrude beyond the fourth surface 50d of the wavelength conversion member 50 in the axis-Z direction. In other words, when the support surface 54r is viewed from the side facing the light emitting surface 56a along the axis-Y direction, a portion of the support surface 54r overlaps with the fourth surface 50d, and the other portion of the support surface 54r is exposed to the space outside of the fourth surface 50d.

Effects of First Embodiment

The light source apparatus 100 according to the present embodiment includes the light emitters 56, which emit the excitation light E having the first wavelength band, the wavelength conversion member 50, which contains a phosphor and converts the excitation light E having the first wavelength band into the fluorescence Y having the second wavelength band different from the first wavelength band, and the support member 54, which supports the wavelength conversion member 50. The wavelength conversion member 50 has the first surface 50a and the second surface 50b, which intersect with each other in the longitudinal direction of the wavelength conversion member 50 and are located on sides opposite from each other, and the third surface 50c, which intersects with the first surface 50a and the second surface 50b, and the wavelength conversion member 50 emits the fluorescence Y via the first surface 50a. The support member 54 has the support surface 54r, which faces the third surface 50c of the wavelength conversion member 50. The support surface 54r has the contact sections 54t, which are in contact with the third surface 50c, and the noncontact sections 54s, which are not in contact with the third surface 50c. The third surface 50c is a planar surface, and the contact sections 54t are each a planar surface.

According to the configuration described above, in which the support surface 54r of the support member 54 has the noncontact sections 54s, which are not in contact with the third surface 50c of the wavelength conversion member 50, the loss of the fluorescence Y that occurs when the fluorescence Y propagating through the interior of the wavelength conversion member 50 is reflected off the support surface 54r can be suppressed, as compared with a configuration in which the entire surface of the support surface is in contact with the third surface of the wavelength conversion member. Furthermore, since the support surface 54r of the support member 54 has the contact sections 54t, which are in contact with the third surface 50c of the wavelength conversion member 50, the heat generated in the wavelength conversion member 50 is transferred to the support member 54 via the contact sections 54t and dissipated out of the support member 54. In particular, since the third surface 50c and the contact sections 54t are in contact with each other via the planar surfaces thereof, a large contact area is achieved as compared with a case where the surface of the support member is roughened, for example, by blasting to form point-shaped protrusions, so that the heat of the wavelength conversion member 50 can be more reliably transferred to the support member 54.

The light source apparatus 100 according to the present embodiment thus suppresses the loss of fluorescence Y due to the reflection thereof at the support member 54, and also suppresses a rise in the temperature of the wavelength conversion member 50 to suppress a decrease in the wavelength conversion efficiency. As a result, fluorescence Y having desired intensity can be produced. Furthermore, the degree of the loss of the fluorescence Y due to the reflection thereof and the degree of the rise in the temperature of the wavelength conversion member 50 can be appropriately controlled by adjusting the ratio of the area of the contact sections 54t to the area of the noncontact sections 54s.

In the light source apparatus 100 according to the present embodiment, air is present between the third surface 50c of the wavelength conversion member 50 and the noncontact sections 54s.

According to the configuration described above, the critical angle at the third surface 50c of the wavelength conversion member 50 can be smaller than the critical angle in a case where a member other than air is present between the third surface 50c of the wavelength conversion member 50 and the noncontact sections 54s. As a result, the loss of the fluorescence Y that occurs when the fluorescence Y is reflected off the third surface 50c of the wavelength conversion member 50 can be minimized.

In the light source apparatus 100 according to the present embodiment, the support surface 54r has the protrusions 54p, which protrude toward the third surface 50c of the wavelength conversion member 50, and the top surfaces of the protrusions 54p form the contact sections.

According to the configuration described above, the temperature of the wavelength conversion member 50 can be appropriately controlled by optimizing the area of the top surfaces of the protrusions 54p.

In the light source apparatus 100 according to the present embodiment, the support surface 54r has a plurality of protrusions 54p, which extend along the longitudinal direction of the wavelength conversion member 50, and the plurality of protrusions 54p are periodically arranged along a direction that intersects with the longitudinal direction of the wavelength conversion member 50.

According to the configuration described above, unevenness of the loss of the fluorescence Y at the wavelength conversion member 50 and the unevenness of the temperature of the wavelength conversion member 50 can both be suppressed to small values. Furthermore, the support member 54 can support the wavelength conversion member 50 in a stable manner.

In the light source apparatus 100 according to the present embodiment, the planarity of the planar surfaces that form the third surface 50c of the wavelength conversion member 50 and the contact sections 54t is smaller than or equal to 5 µm.

According to the configuration described above, the third surface 50c of the wavelength conversion member 50 and the contact sections 54t are more adequately in contact with each other, whereby stable heat dissipation and light intensity can be ensured. According to the study conducted by the present inventor, setting the planarity at a value smaller than or equal to 5 µm can ensure that the wavelength conversion member 50 has a temperature lower than or equal to 100° C., which is the guideline for management of the temperature of the wavelength conversion member 50. A surface roughening treatment such as blasting is unlikely to achieve the planarity smaller than or equal to 5 µm in a stable manner, it is difficult to appropriately maintain the temperature of the wavelength conversion member 50.

In the light source apparatus 100 according to the present embodiment, the first wall surface 54a has the first section 54a1, which is located at the side relatively far from the support surface 54r and extends in the direction perpendicular to the support surface 54r, and the second section 54a2, which is located relatively close to the support surface 54r and extends obliquely with respect to the support surface 54r. The second section 54a2 reflects at least part of the excitation light E. The distance between the second section 54a2, which is located at the side relatively close to the support surface 54r, and the fifth surface 50e of the wavelength conversion member 50 is smaller than the distance between the second section 54a2, which is located at the side relatively close to the first section 54a1, and the fifth surface 50e of the wavelength conversion member 50.

According to the configuration described above, excitation light E2, which is part of the excitation light E emitted via the light emitting surface 56a of the light emitter 56, passes through the gap S1 between the fifth surface 50e of the wavelength conversion member 50 and the first section 54a1, and is then incident on the second section 54a2, which inclines with respect to the support surface 54r, as shown in FIG. 3. In this process, the excitation light E2 is reflected off the second section 54a2 and incident on the fifth surface 50e of the wavelength conversion member 50. The amount of excitation light E that is reflected off the support surface 54r and returns toward the light source section 51 can thus be reduced. Furthermore, in the present embodiment, the excitation light E1 emitted from the −Z-side end of the light emitting surface 56a, passing through the +Z-side corner of the third surface 50c of the wavelength conversion member 50, and traveling toward the first wall surface 54a is reflected off the first section 54a1, which extends in the direction perpendicular to the support surface 54r, and is incident on the fifth surface 50e of the wavelength conversion member 50. The amount of excitation light E that is reflected off the inclining first wall surface and returns toward the light source section 51 can thus be reduced. Furthermore, in the present embodiment, the amount of excitation light E can be sufficiently ensured by using the light emitters 56, which each have an area larger than that of the wavelength conversion member 50. As described above, the present embodiment can provide a light source apparatus 100 that uses the excitation light E in a highly efficient manner and readily produces fluorescence Y having desired intensity.

The projector 1 according to the present embodiment, which includes the light source apparatus 100 according to the present embodiment, excels in the light utilization efficiency.

Second Embodiment

A second embodiment of the present disclosure will be described below with reference to FIGS. 5 and 6.

The basic configurations of the projector and the light source apparatus according to the second embodiment are the same as those in the first embodiment, but the configuration of the support member differs from that in the first embodiment. The basic configurations of the projector and the light source apparatus will therefore not be described.

Figure 5:
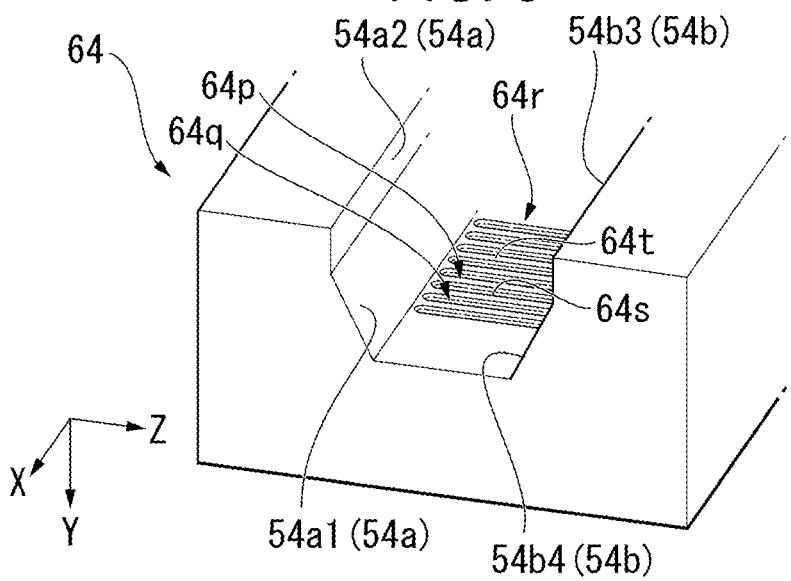
FIG. 5 is a perspective view of a support member in the light source apparatus according to a second embodiment.

FIG. 5 is a perspective view of a support member 64 in the light source apparatus according to the second embodiment. FIG. 6 is a plan view of the light source apparatus.

Figure 6:
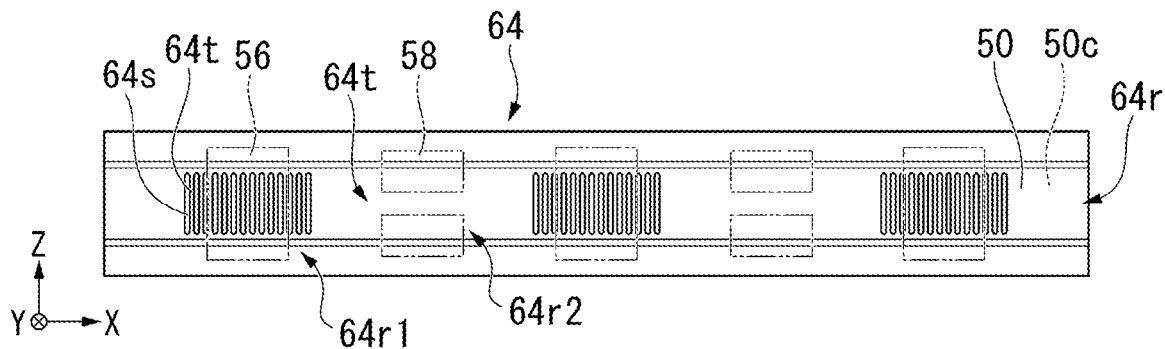
FIG. 6 is a plan view of the light source apparatus.

In FIGS. 5 and 6, components common to those in the figures used in the first embodiment have the same reference characters and will not be described.

In the light source apparatus according to the present embodiment, the support member 64 has a support surface 64r, which faces the third surface 50c of the wavelength conversion member 50 and supports the wavelength conversion member 50, as shown in FIG. 5. The support surface 64r is provided with a plurality of protrusions 64p and a plurality of recesses 64q extending in a direction (axis-Z direction) that intersects with the longitudinal direction of the wavelength conversion member 50. The support surface 64r includes contact sections 64t, which are in contact with the third surface 50c of the wavelength conversion member 50, and noncontact sections 64s, which are not in contact with the third surface 50c of the wavelength conversion member 50.

The support surface 64r has the plurality of protrusions 64p, which protrude toward the third surface 50c of the wavelength conversion member 50. The plurality of protrusions 64p are periodically arranged along the longitudinal direction (axis-X direction) of the wavelength conversion member 50. The contact sections 64t correspond to the top surfaces of the protrusions 64p. The noncontact sections 64s correspond to groove-shaped recesses 64q between adjacent protrusions 64p. The contact sections 64t and the noncontact sections 64s are alternately arranged. The number of contact sections 64t and noncontact sections 64s is not limited to a specific number.

In the present embodiment, the support surface 64r has first regions 64r1, which are provided with the contact sections 64t and the noncontact sections 64s, and second regions 64r2, which are provided with the contact sections 64t but are not provided with the noncontact sections 64s, as shown in FIG. 6. That is, the noncontact sections 64s are not provided in the entire region of the support surface 64r, but are provided only in specific regions.

The pressing member 58 is provided at two locations separate from each other in the longitudinal direction (axis-X direction) of the wavelength conversion member 50. When the light source apparatus is viewed in the direction perpendicular to the third surface 50c of the wavelength conversion member 50 (axis-Y direction), the regions where the pressing members 58 are in contact with the wavelength conversion member 50 overlap the second regions 64r2 of the support surface 64r. The light emitters 56 are disposed at positions where the light emitters 56 overlap with the first regions 64r1 of the support surface 64r. That is, the pressing members 58 are disposed at positions where pressing members 58 overlap with the second regions 64r2, where only the contact sections 64t are provided, but do not overlap with the light emitters 56, in the longitudinal direction (axis-X direction) of the wavelength conversion member 50. The other configurations of the light source apparatus are the same as those in the first embodiment.

Effects of Second Embodiment

The present embodiment, in which the loss of the fluorescence Y due to the reflection thereof at the support member 64 and the decrease in the wavelength conversion efficiency due to a rise in the temperature of the wavelength conversion member 50 are suppressed, provides the same effects as those in the first embodiment, for example, a light source apparatus that readily generates fluorescence Y having desired intensity can be achieved.

In the light source apparatus according to the present embodiment, the support surface 64r of the support member 64 has the plurality of protrusions 64p, which extend along a direction (axis-Z direction) that intersects with the longitudinal direction of the wavelength conversion member 50, and the plurality of protrusions 64p are periodically arranged along the longitudinal direction of the wavelength conversion member 50.

According to the configuration described above, the ratio of the area of the contact sections 64t to the area of the noncontact sections 64s is readily adjusted, whereby the temperature of the wavelength conversion member 50 is readily controlled.

In the light source apparatus according to the present embodiment, the support surface 64r has the first regions 64r1, where the contact sections 64t and the noncontact sections 64s are provided, and the second regions 64r2, where the contact sections 64t are provided but the noncontact sections 64s are not provided. When viewed in the direction perpendicular to the third surface 50c (axis-Y direction), the regions where the pressing members 58 are in contact with the wavelength conversion member 50 overlap the second regions 64r2 of the support surface 64r.

According to the configuration described above, in which the noncontact sections 64s are not disposed in the regions where the pressing members 58 are in contact with the wavelength conversion member 50, the support member 64 can support the wavelength conversion member 50 in a stable manner. Furthermore, the pressing members 58 disposed at positions where the pressing members 58 do not overlap with the light emitters 56 are unlikely to block the excitation light E emitted from the light emitters 56.

Third Embodiment

A third embodiment of the present disclosure will be described below with reference to FIG. 7.

The basic configurations of the projector and the light source apparatus according to the third embodiment are the same as those in the first embodiment, but the configuration of the support member differs from that in the first embodiment. The basic configurations of the projector and the light source apparatus will therefore not be described.

Figure 7:
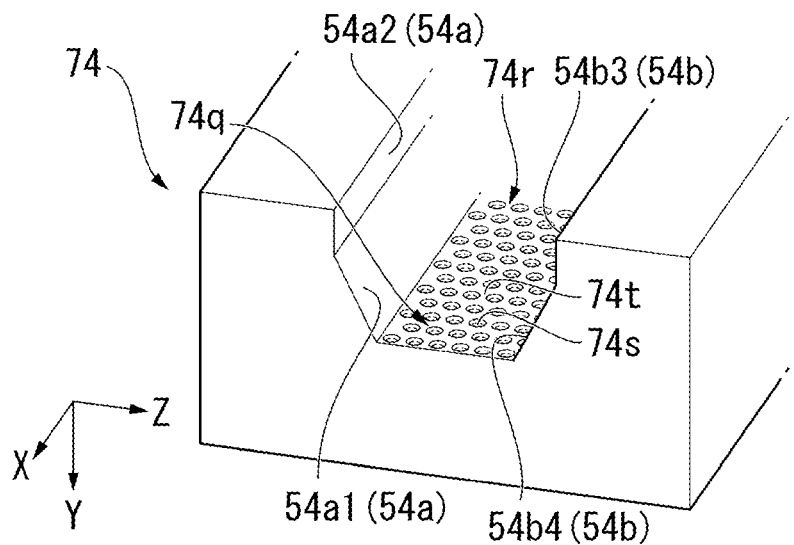
FIG. 7 is a perspective view of a support member in the light source apparatus according to a third embodiment.

FIG. 7 is a perspective view of a support member 74 in the light source apparatus according to the third embodiment.

In FIG. 7, components common to those in the figures used in the first embodiment have the same reference characters and will not be described.

In the light source apparatus according to the present embodiment, the support member 74 has a support surface 74r, which faces the third surface 50c of the wavelength conversion member 50 and supports the wavelength conversion member 50, as shown in FIG. 7. The support surface 74r has a plurality of recesses 74q, which are recessed with respect to the third surface 50c of the wavelength conversion member 50. The support surface is formed of the contact sections 74t corresponding to the portions other than recesses 74q and the noncontact sections 74s corresponding to the recesses 74q. That is, the support surface 74r has the contact sections 74t, which are in contact with the third surface 50c of the wavelength conversion member 50, and the noncontact sections 74s, which are not in contact with the third surface 50c of the wavelength conversion member 50.

The plurality of recesses 74q are regularly provided at intervals in the longitudinal direction (axis-X direction) of the wavelength conversion member 50 and a direction (axis-Z direction) that intersects with the longitudinal direction. The recesses 74q each have a circular shape and is spherically recessed when viewed in the direction perpendicular to the third surface 50c of the wavelength conversion member 50 (axis-Y direction). The shape and arrangement of the recesses 74q are not limited to a specific shape and arrangement. Also as in the light source apparatus according to the present embodiment, the plurality of recesses 74q may be provided only in specific regions of the support surface 74r, as in the second embodiment. That is, the support surface 74r may have first regions where the contact sections 74t and the noncontact sections 74s are provided and second regions where the contact sections 74t are provided but the noncontact sections 74s are not provided. Instead, the plurality of recesses 74q may be provided across the entire support surface 74r. The other configurations of the light source apparatus are the same as those in the first embodiment.

Effects of Third Embodiment

The present embodiment, in which the loss of the fluorescence Y due to the reflection thereof at the support member 74 and the decrease in the wavelength conversion efficiency due to a rise in the temperature of the wavelength conversion member 50 are suppressed, provides the same effects as those in the first embodiment, for example, a light source apparatus that readily generates fluorescence Y having desired intensity can be achieved.

In the light source apparatus according to the present embodiment, the support surface 74r of the support member 74 has the plurality of recesses 74q, which are recessed with respect to the third surface 50c of the wavelength conversion member 50, and the portions of the support surface 74r that correspond to the portions other than the recesses 74q are the contact sections 74t.

According to the configuration described above, the temperature of the wavelength conversion member 50 can be appropriately controlled by optimizing the entire area of the plurality of recesses 74q. The configuration in the present embodiment is suitable in a case where the contact sections 74t are configured to be sufficiently larger in terms of area than the noncontact sections 74s. Employing the configuration described above allows the support member 74 to reliably dissipate the heat of the wavelength conversion member 50 and to support the wavelength conversion member 50 in a stable manner.

The technical scope of the present disclosure is not limited to the embodiments described above, and a variety of changes can be made thereto to the extent that the changes do not depart from the intent of the present disclosure. An aspect of the present disclosure can be an appropriate combination of the characteristic portions in the embodiments described above.

For example, in the light source apparatuses according to the first and second embodiments, the protrusions and the recesses of the support surface of the support member extend in one of the longitudinal direction (axis-X direction) of the wavelength conversion member and a direction perpendicular to the longitudinal direction (axis-Z direction) and may instead extend in both the longitudinal direction (axis-X direction) of the wavelength conversion member and a direction perpendicular to the longitudinal direction (axis-Z direction) so that the protrusions and the recesses are arranged in a lattice arrangement when viewed in the direction perpendicular to the third surface of the wavelength conversion member. Still instead, the protrusions and the recesses of the support surface of the support member may extend obliquely with respect to the longitudinal direction (axis-X direction) of the wavelength conversion member and the direction (axis-Z direction) perpendicular to the longitudinal direction.

The light source apparatuses according to the embodiments described above each include a wavelength conversion member, and this configuration may be replaced with a configuration including a light guiding member that contains no phosphor but causes incident light to propagate through the light guiding member and then the light to exit out thereof without wavelength conversion. The configuration described above can also suppress both the light loss due to the reflection thereof at the support member and the occurrence of problems due to a rise in the temperature of the light guiding member.

In addition, the specific descriptions of the shape, the number, the arrangement, the material, and other factors of the components of the light source apparatus and the projector are not limited to those in the embodiments described above and can be changed as appropriate. The above embodiments have been described with reference to the case where the light source apparatuses according to the present disclosure are each incorporated in a projector using liquid crystal panels, but not necessarily. The light source apparatuses according to the present disclosure may each be incorporated in a projector using a digital micromirror device as each of the light modulators. The projector may not include a plurality of light modulators and may instead include only one light modulator.

The above embodiments have been described with reference to the case where the light source apparatuses according to the present disclosure are each incorporated in a projector, but not necessarily. The light source apparatuses according to the present disclosure may each be used as a lighting apparatus, a headlight of an automobile, and other components.

A light source apparatus according to an aspect of the present disclosure may have the configuration below.

The light source apparatus according to the aspect of the present disclosure includes a light emitter that emits light, a light guiding member that guides the light outputted from the light emitter, and a support member that supports the light guiding member. The light guiding member has a first surface and a second surface that intersect with the longitudinal direction of the light guiding member and are located on sides opposite from each other, and a third surface that intersects with the first and second surfaces, and causes light to exit via the first surface. The support member has a support surface that faces the third surface of the light guiding member. The support surface has a contact section that is in contact with the third surface and a noncontact section that is not in contact with the third surface. The third surface is a planar surface, and the contact section is a planar surface.

In the light source apparatus according to the aspect of the present disclosure, air may be present between the third surface and the noncontact section.

In the light source apparatus according to the aspect of the present disclosure, the support surface may have a protrusion that protrudes toward the third surface of the light guiding member, and the top surface of the protrusion may be the contact section.

In the light source apparatus according to the aspect of the present disclosure, the support surface may have a plurality of the protrusions. The protrusions may extend along the longitudinal direction of the light guiding member, and the plurality of protrusions may be periodically arranged along a direction that intersects with the longitudinal direction of the light guiding member.

In the light source apparatus according to the aspect of the present disclosure, the support surface may have a plurality of the protrusions. The protrusions may extend along a direction that intersects with the longitudinal direction of the light guiding member, and the plurality of protrusions may be periodically arranged along the longitudinal direction of the light guiding member.

In the light source apparatus according to the aspect of the present disclosure, the support surface may have a recess that is recessed with respect to the third surface of the light guiding member, and the portion, of the support surface, that is not the recess may be the contact section.

The light source apparatus according to the aspect of the present disclosure may further include a pressing member that presses the light guiding member against the support member. The support surface may have a first region where the contact section and the noncontact section are provided and a second region where the contact section is provided but the noncontact section is not provided. When viewed in a direction perpendicular to the third surface, the region where the pressing member is in contact with the light guiding member may overlap with the second region of the support surface.

In the light source apparatus according to the aspect of the present disclosure, the planarity of the planar surfaces that form the third surface and the contact section may be smaller than or equal to 5 μm.

In the light source apparatus according to the aspect of the present disclosure, the light emitter may output first light having a first wavelength band. The light guiding member may be a wavelength conversion member that contains a phosphor, converts the first light outputted from the light emitter into second light having a second wavelength band different from the first wavelength band, and outputs the second light via the first surface.

A projector according to another aspect of the present disclosure may have the configuration below.

The projector according to the other aspect of the present disclosure includes the light source apparatus according to the aspect of the present disclosure, a light modulator that modulates light outputted from the light source apparatus and containing the second light in accordance with image information, and a projection optical apparatus that projects the light modulated by the light modulator.

What is claimed is:

1. A light source apparatus comprising:
   a light emitter that outputs light;
   a light guiding member that guides the light outputted from the light emitter; and
   a support member that supports the light guiding member,
   wherein the light guiding member has a first surface and a second surface that intersect with a longitudinal direction of the light guiding member and are located on sides opposite from each other, and a third surface that intersects with the first and second surfaces, and causes light to exit via the first surface,
   the support member has a support surface that faces the third surface of the light guiding member,
   the support surface has a contact section that is in contact with the third surface and a noncontact section that is not in contact with the third surface, and
   the third surface is a planar surface, and the contact section is a planar surface.

2. The light source apparatus according to claim 1, wherein air is present between the third surface and the noncontact section.

3. The light source apparatus according to claim 1,
   wherein the support surface has a protrusion that protrudes toward the third surface of the light guiding member, and
   a top surface of the protrusion is the contact section.

4. The light source apparatus according to claim 3,
   wherein the support surface has a plurality of the protrusions, the protrusions extend along the longitudinal direction of the light guiding member, and the plurality of protrusions are periodically arranged along a direction that intersects with the longitudinal direction of the light guiding member.

5. The light source apparatus according to claim 3, wherein the support surface has a plurality of the protrusions, the protrusions extend along a direction that intersects with the longitudinal direction of the light guiding member, and the plurality of protrusions are periodically arranged along the longitudinal direction of the light guiding member.

6. The light source apparatus according to claim 1, wherein the support surface has a recess that is recessed with respect to the third surface of the light guiding member, and a portion, of the support surface, that is not the recess is the contact section.

7. The light source apparatus according claim 1, further comprising a pressing member that presses the light guiding member against the support member, wherein the support surface has a first region where the contact section and the noncontact section are provided and a second region where the contact section is provided but the noncontact section is not provided, and when viewed in a direction perpendicular to the third surface, a region where the pressing member is in contact with the light guiding member overlaps with the second region of the support surface.

8. The light source apparatus according to claim 1, wherein planarity of the planar surfaces that form the third surface and the contact section is smaller than or equal to 5 µm.

9. The light source apparatus according to claim 1, wherein the light emitter outputs first light having a first wavelength band, the light guiding member is a wavelength conversion member that contains a phosphor, converts the first light outputted from the light emitter into second light having a second wavelength band different from the first wavelength band, and outputs the second light via the first surface.

10. A projector comprising:

the light source apparatus according to claim 9;

a light modulator that modulates light outputted from the light source apparatus and containing the second light in accordance with image information; and a projection optical apparatus that projects the light modulated by the light modulator.

\* \* \* \* \*